(12) United States Patent
Gustavsson et al.

(10) Patent No.: US 9,301,214 B2
(45) Date of Patent: *Mar. 29, 2016

(54) METHOD AND DEVICE IN A TELECOMMUNICATIONS SYSTEM

(71) Applicant: Telefonaktiebolaget L M Ericsson (publ), Stockholm (SE)

(72) Inventors: Pär Gustavsson, Linköping (SE); Thomas Johansson, Åby (SE); Magnus Olsson, Stockholm (SE); Paul Schliwa-Bertling, Ljungsbro (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/670,042

(22) Filed: Mar. 26, 2015

(65) Prior Publication Data
US 2015/0264605 A1 Sep. 17, 2015

Related U.S. Application Data

(63) Continuation of application No. 13/390,405, filed as application No. PCT/SE2012/050092 on Jan. 31, 2012, now Pat. No. 9,125,110.

(60) Provisional application No. 61/440,173, filed on Feb. 7, 2011.

(51) Int. Cl.
*H04W 36/00* (2009.01)
*H04W 36/38* (2009.01)
*H04W 88/10* (2009.01)

(52) U.S. Cl.
CPC .......... *H04W 36/0022* (2013.01); *H04W 36/38* (2013.01); *H04W 88/10* (2013.01)

(58) Field of Classification Search
CPC ................................................. H04W 36/0022
USPC ............... 455/436–439, 426.1, 428; 370/328, 370/331, 332, 335, 338, 356
See application file for complete search history.

(56) References Cited

U.S. PATENT DOCUMENTS

2009/0247165 A1 10/2009 Chen et al.
2010/0113010 A1 5/2010 Tenny et al.
(Continued)

FOREIGN PATENT DOCUMENTS

WO 2010128290 A1 11/2010

OTHER PUBLICATIONS

3GPP, "3rd Generation Partnership Project; Technical Specification Group Core Network and Terminals; Mobile radio interface Layer 3 specification; Core network protocols; Stage 3 (Release 10)", 3GPP TS 24.008 V10.1.0, Dec. 2012, 1-625.
(Continued)

*Primary Examiner* — Cong Tran
(74) *Attorney, Agent, or Firm* — Murphy, Bilak & Homiller, PLLC

(57) ABSTRACT

In a method in a central node of a cellular radio network the central node is adapted to deciding if a mobile station connected to the cellular radio network via a first radio access technology controlled by the central node is to be moved to another radio access technology when a circuit switched call of the mobile station is ended. It is assumed that the cellular radio network is adapted to use a fallback to circuit switched procedure. First it is decided that a CS call for a particular mobile station has ended. Then in it is checked if the CS call was the result of a fallback to CS procedure. The central node then decides if the mobile station is to be moved to another radio access technology based at least partly on the, i.e. if the CS call was a result of a CS fallback procedure.

9 Claims, 9 Drawing Sheets

(56) References Cited

U.S. PATENT DOCUMENTS

| | | | |
|---|---|---|---|
| 2010/0151863 A1 | 6/2010 | Kubo | |
| 2010/0284333 A1 | 11/2010 | Shirota et al. | |
| 2010/0296421 A1 | 11/2010 | Watfa et al. | |
| 2010/0302937 A1 | 12/2010 | Hu et al. | |
| 2010/0317347 A1 | 12/2010 | Burbidge et al. | |
| 2011/0044248 A1 | 2/2011 | Saranu et al. | |
| 2011/0064052 A1* | 3/2011 | Lee | 370/331 |
| 2011/0176414 A1 | 7/2011 | De Franca Lima et al. | |
| 2011/0188451 A1 | 8/2011 | Song et al. | |
| 2011/0188470 A1* | 8/2011 | Lu et al. | 370/331 |
| 2011/0199893 A1 | 8/2011 | Tanaka et al. | |
| 2011/0216645 A1 | 9/2011 | Song et al. | |
| 2011/0274038 A1 | 11/2011 | Zhu et al. | |
| 2011/0286427 A1 | 11/2011 | Shirota et al. | |
| 2012/0157071 A1 | 6/2012 | Pudney et al. | |
| 2012/0170503 A1 | 7/2012 | Kelley et al. | |

OTHER PUBLICATIONS

3GPP, "3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol", 3GPP TS 44.060 V10.3.0, Dec. 2010, 1-623.

3GPP, "3rd Generation Partnership Project; Technical Specification Group GSM/EDGE Radio Access Network; Mobile radio interface layer 3 specification; Radio Resource Control (RRC) protocol (Release 10)", 3GPP TS 44.018 V10.1.0, Dec. 2010, 1-429.

3GPP, "3rd Generation Partnership Project; Technical Specification Group GSM/EDGE Radio Access Network; Mobile Switching Centre—Base Station System (MSC-BSS) interface; Layer 3 specification (Release 10)", 3GPP TS 48.008 V10.0.0, Jan. 2011, 1-213.

3GPP, "3rd Generation Partnership Project; Technical Specification Group Radio Access Network; Radio Resource Control (RRC); Protocol specification (Release 10)", 3GPP TS 25.331 V10.2.0, Dec. 2010, 1-1834.

3GPP, "3rd Generation Partnership Project; Technical Specification Group Radio Access Network; UTRAN Iu interface Radio Access Network Application Part (RANAP) signalling (Release 10)", 3GPP TS 25.413 V10.0.0, Dec. 2012, 1-409.

3GPP, "3rd Generation Partnership Project; Technical Specification Group Services and System Aspects; Circuit Switched (CS) fallback in Evolved Packet System (EPS); Stage 2 (Release 10) The present", 3GPP TS 23.272 V10.2.0, Dec. 2010, 1-79.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.2.0, Dec. 2010, 1-276.

Unknown, Author, "Clarification of CSFB Indication in Extended Service Request", 3GPP TSG SA WG2 Meeting #81, S2-105142, Prague, Czech, Oct. 11-15, 2012.

* cited by examiner

METHOD AND DEVICE IN A TELECOMMUNICATIONS SYSTEM

TECHNICAL FIELD

The present disclosure relates to a method and device in a telecommunication system, in particular to a method and device for providing a preferred distribution of idle User Equipments (UEs) between different Radio Access Technologies (RATs), and also methods and devices for providing information to the RATs in order to obtain the preferred distribution.

BACKGROUND

Mobile Circuit Switched (CS) services based on Global System for Mobile communications (GSM) and Wideband Code Division Multiple Access (WCDMA) radio access allow obtaining telecommunication services with a single subscription in almost all countries of the world. Also today, the number of CS subscribers is still growing rapidly, boosted by the roll out of mobile CS services in dense population countries such as India and China. In addition the classical Mobile Switching Center (MSC) architecture is changed into a so-called softswitch solution which allows using packet transport infrastructure for mobile CS services.

The third generation partnership project (3GPP) has completed the work item "Evolved UTRA and UTRAN" that defines a Long-Term Evolution (LTE) concept to assure competitiveness of 3GPP-based access technology. It was preceded by an extensive evaluation phase of possible features and techniques in the Radio Access Network (RAN) workgroups that concluded that the agreed system concepts can meet most of the requirements and no significant issue was identified in terms of feasibility.

In parallel to the RAN standardization 3GPP has also driven a System Architecture Evolution (SAE) work item to develop an evolved core network. The SAE core network is made up of core nodes, which are further, according to an Ericsson proposal split, into Control Plane (Mobility Management Entity, MME) and User Plane Gateway (Serving Gateway, S-GW and PDN Gateway, PDN GW) nodes. The resulting network architecture is shown in FIG. 1. Thus, FIG. 1 depicts nodes and interfaces in an LTE radio network and also a terminal (UE) connected thereto.

Common to both LTE and SAE is that only a Packet Switched (PS) domain has been specified, i.e. all services are to be supported via this domain. GSM and WCDMA however provide both PS and CS access simultaneously.

A solution called "CS Fallback" has been standardized and the stage 2 solution is defined in 3GPP Technical Specification TS 23.272 and FIG. 2 shows the "CS Fallback" architecture. In FIG. 2 the nodes and related interface between the nodes of a cellular radio network employing a CS Fallback solution is depicted. The nodes are typically implemented using hardware and software adapted to perform the different tasks associated with a respective node and also with communication means for digitally connecting with other nodes using the depicted interfaces.

The main principle of "CS Fallback" is that the terminal, i.e. the mobile station (MS) or User Equipment (UE) is performing normal SAE Mobility Management (MM) procedures towards the MME while camping on LTE radio access. The MME registers the terminal in the MSC Server (MSC-S) for CS based services using the SGs-interface. When a page for CS services is received in the MSC-S it is forwarded to the terminal via the MME (using the SGs-interface) and then the terminal performs fallback to GSM EDGE Radio Access Network (GERAN) or Universal Terrestrial Radio Access Network (UTRAN) and responds to paging via the selected RAN. Similar behavior applies for CS services originating in the terminal (mobile station). When these are triggered and the terminal is camping on LTE access (evolved UTRAN, E-UTRAN), the terminal performs fallback to GERAN or UTRAN and triggers initiation of the CS service there. Different solutions have been discussed for the "fallback" mechanism, such as PS Handover and inter-Radio Access Technology (RAT) cell change order (possibly with NACC, Network Assisted Cell Change)

FIG. 3 shows the case of a Mobile Station initiating a call in Active Mode and when PS Handover (HO) is supported. It is further described in section 6.2 of 3GPP TS 23.272, and one particular step, step 3, is further described in 3GPP TS 23.401 and depicted in FIG. 4.

Once the terminal (MS/UE) is done with the CS service in CS domain, it may return back to E-UTRAN using existing mechanisms or may be kept in 2G or 3G coverage, i.e. provided radio access via GERAN or UTRAN.

In idle mode, a mobile station normally performs cell reselection using information received in system information from the network. The network may however decide to change the cell reselection behavior for individual terminals. For example, the system information might be set to favor LTE before WCDMA and GSM but the network might detect that a particular user is better served in GSM. In such a case, the network can change the cell reselection parameters for that terminal so it will stay in GSM while in idle mode. It is however typically important and beneficial to keep a preferred distribution of UEs in idle mode between GSM/WCDMA systems and LTE.

When a CS connection to an E-UTRAN capable MS/UE being connected to a 2G or 3G network is about to be terminated/released, the Base Station Controller/Radio Network Controller (BSC/RNC) may decide whether:

To send the MS/UE to E-UTRAN using explicit signaling, also known as release in GERAN or Radio resource Control (RRC) Connection Release with Redirect in UTRAN or by including the "Cell selection indicator after release of TCH and SDCCH" in CHANNEL RELEASE in GERAN.
  To keep the UE in the current RAT (for example GSM or WCDMA)

There is a desire to improve the performance in cellular radio networks. In particular there is a desire to improve performance in deployment scenarios where many radio access technologies such as GERAN/UTRAN and E-UTRAN are deployed in the same area and where fallback to CS is used.

SUMMARY

It is an aspect of the present disclosure to provide an improved method and device for keeping a preferred distribution of idle UEs between GERAN/UTRAN and E-UTRAN.

This is obtained by the methods and devices as set out in the appended claims.

The decision whether the UE shall be kept in GERAN/UTRAN (also termed 2G/3G), or moved back to E-UTRAN in a fast manner can in some embodiments be made by using explicit signaling in the radio access network taking into account e.g. the fact whether a CS call was performed as a result of a native CS fallback (CSFB) procedure, i.e. a procedure described above by which the UE has been moved from the E-UTRAN coverage to 2G/3G coverage so the CS call can be performed.

When making such a decision the knowledge of whether the CS call is performed due to CSFB or not as well as if it was a native CSFB is helpful. In accordance with some embodiments, if the call has used a CSFB procedure, the mobile station is returned to E-UTRAN but if it the call was originally setup in a 2G/3G cell with E-UTRAN coverage, the mobile station is kept in 2G/3G.

It is also an aspect of the disclosure to provide methods and arrangements for informing a Base station Controller/Radio Network Controller (BSC/RNC) whether a CS call has used the CSFB procedure or not.

These methods are described in more detail in the detailed description.

Thus, in accordance with some embodiments a method in a central node of a cellular radio network the central node is provided where the central node is adapted to deciding if a mobile station connected to the cellular radio network via a first radio access technology controlled by the central node is to be moved to another radio access technology when a circuit switched call of the mobile station is ended. It is assumed that the cellular radio network is adapted to use a fallback to circuit switched procedure. First it is decided that a CS call for a particular mobile station has ended. Then it is checked if the CS call was the result of a fallback to CS procedure. The central node then decides if the mobile station is to be moved to another radio access technology based at least partly on the determination, i.e. if the CS call was a result of a CS fallback procedure.

For example if the circuit switched call was made by a mobile station having performed a fallback to circuit switched procedure, the mobile station can be returned to an original radio access technology from which radio access the fallback to circuit switched procedure was performed. The original radio access technology can in accordance with some embodiments be an evolved UTRAN or a similar radio access technology not supporting a CS connection.

In accordance with some embodiments, the central node, which can be an RNC or a BSC receives information about if the circuit switched call has resulted from fallback to circuit switch procedure or not in a message from a Mobile Switching Center.

The disclosure also extends to nodes, such as a RNC or a BSC, and also to a Mobile Switching Center in a cellular radio system configured to perform the methods as described herein. The nodes can be provided with a controller/controller circuitry for performing the above processes. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

BRIEF DESCRIPTION OF THE DRAWINGS

The invention will now be described in more detail by way of non-limiting examples and with reference to the accompanying drawings, in which.

DETAILED DESCRIPTION

Figure 1:
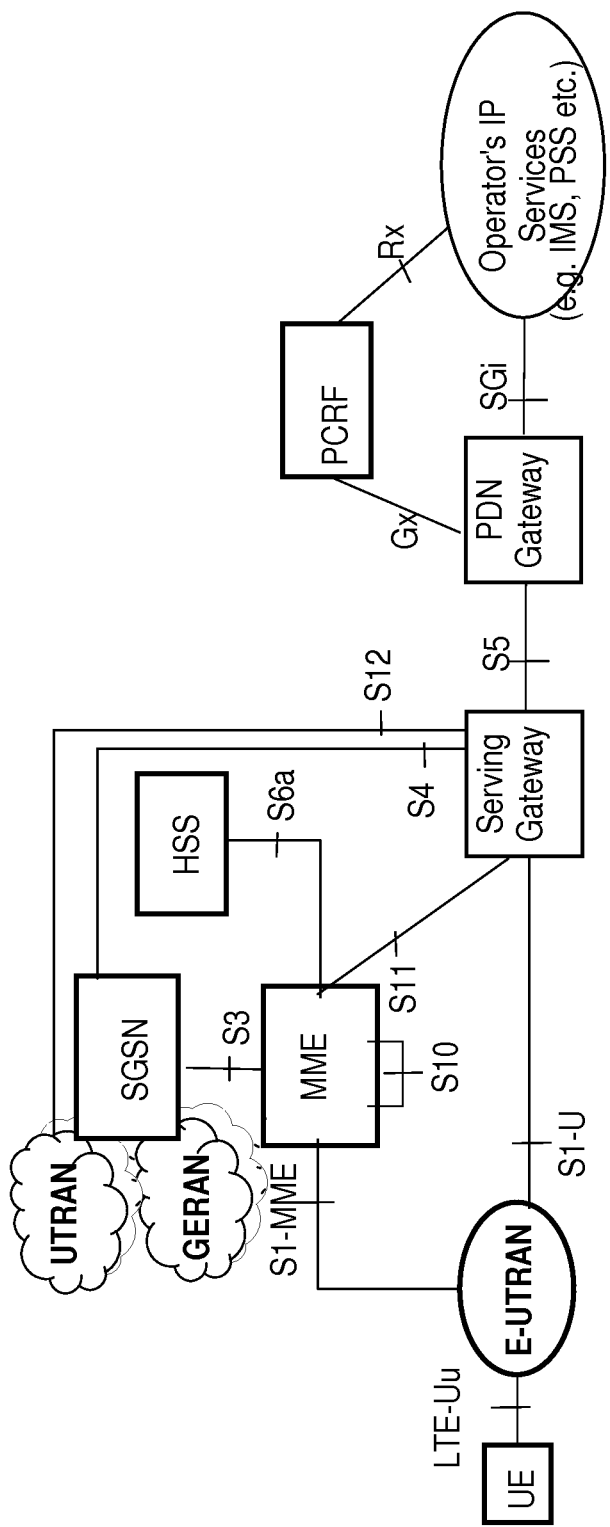
FIG. 1 shows the SAE/LTE architecture.
Figure 2:
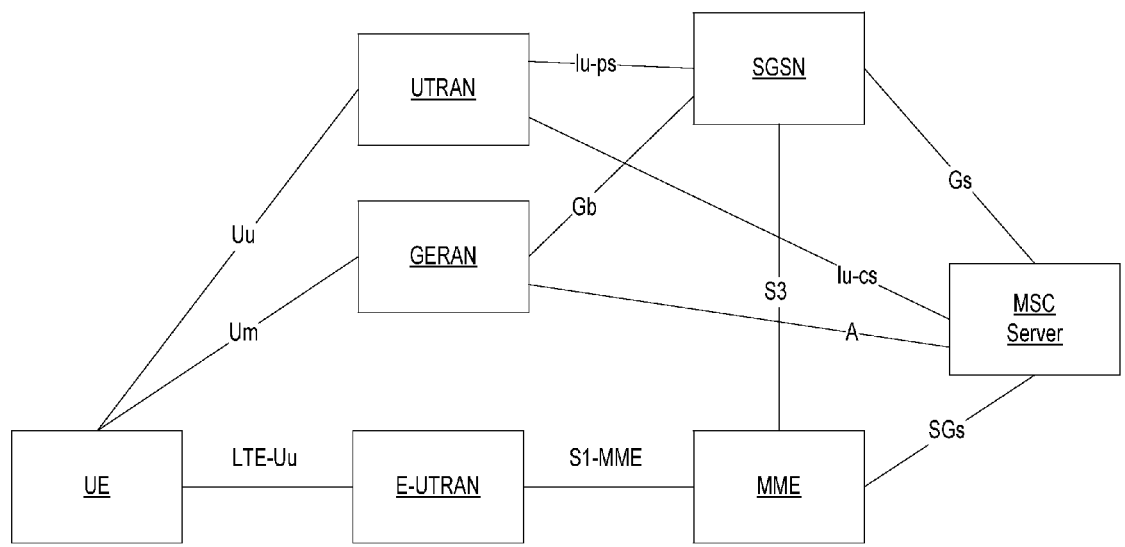
FIG. 2 illustrates the CS Fallback architecture.
Figure 3:
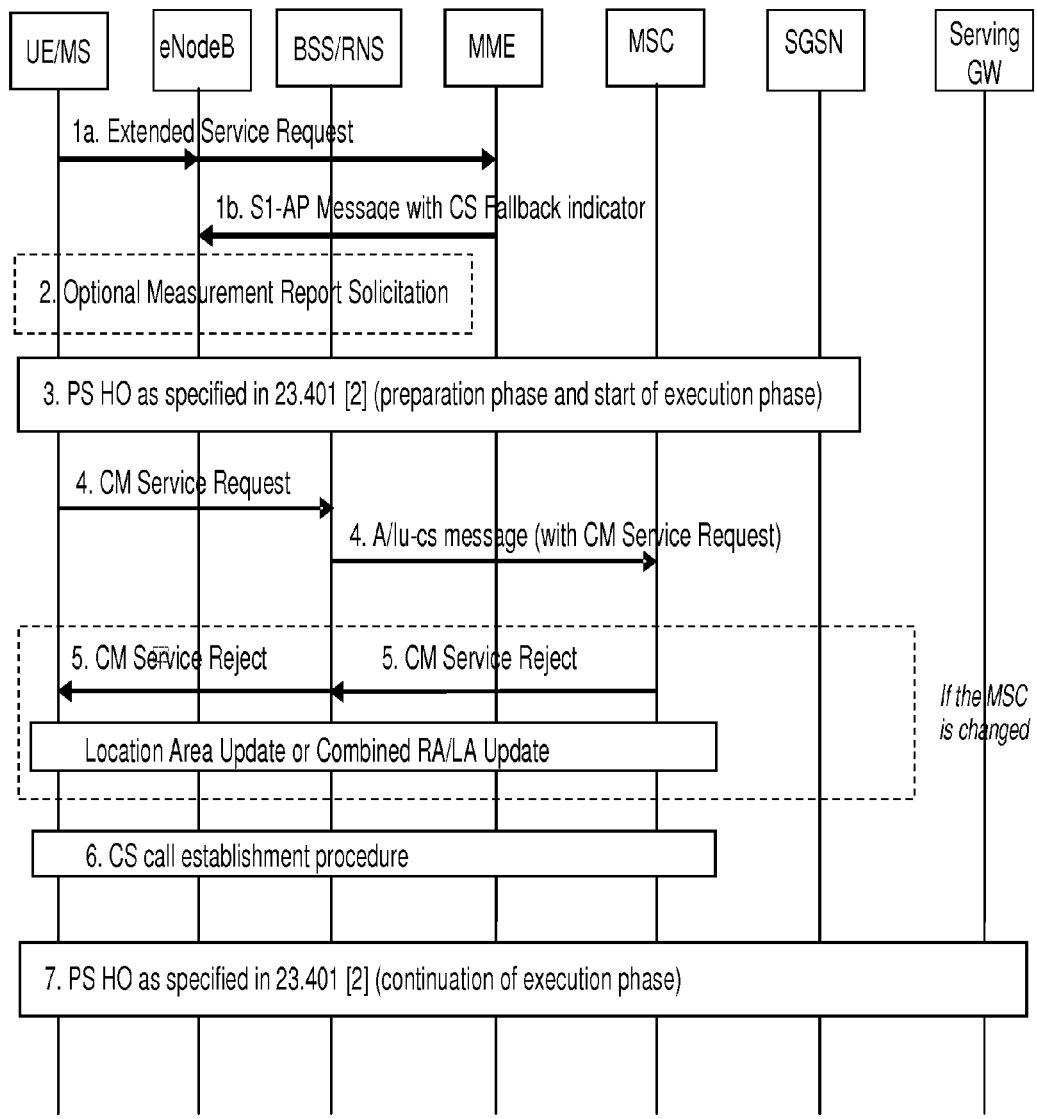
FIG. 3 shows CS Fallback-Mobile Originating Call in active mode, PS HO.
Figure 4:
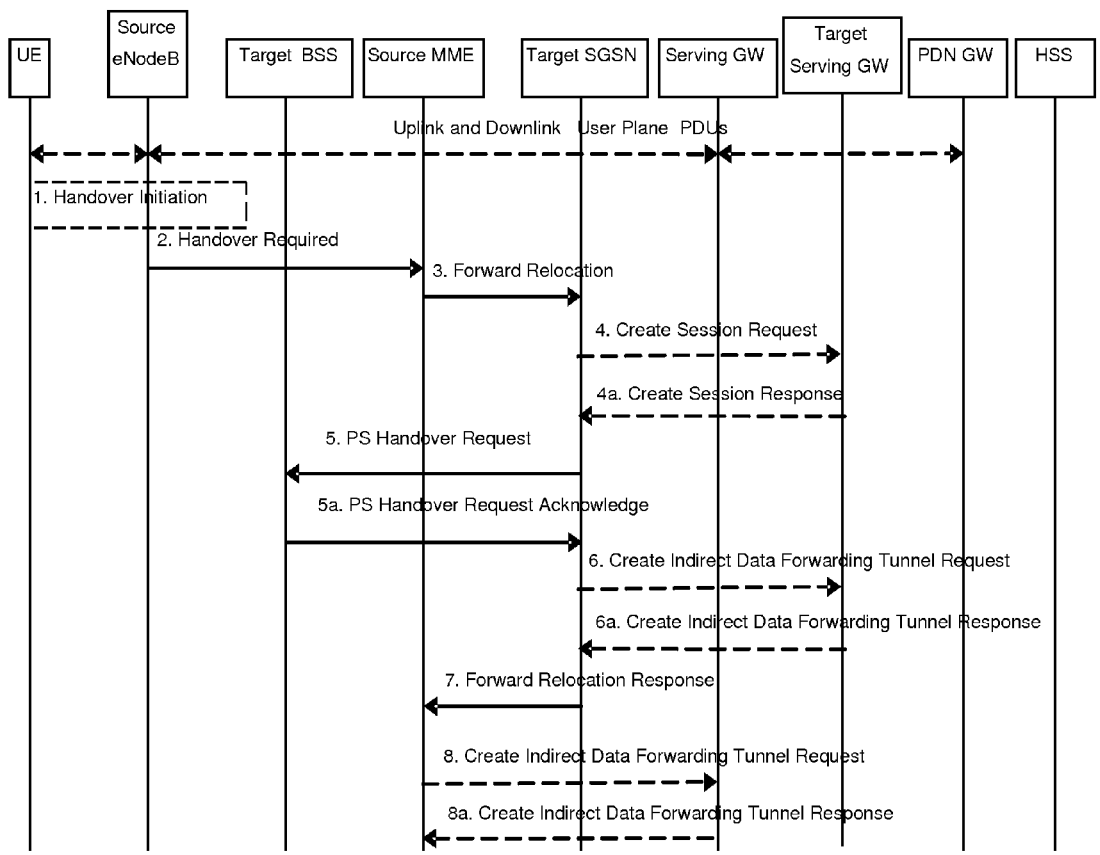
FIG. 4 shows a PS HO from E-UTRAN to GERAN, preparation phase.

In the following description, describing some exemplary embodiments, two scenarios are analyzed: A mobile station originated Circuit Switched Fallback (CSFB) call respective a mobile station terminated CSFB call. In relation to these two exemplary scenarios it is here assumed that CSFB capable Long Term Evolution/Wideband Code Division Multiple Access/Global System for Mobile communication (LTE/WCDMA/GSM) mobile terminals in idle mode are distributed on a combined GSM/WCDMA/LTE network based on some criteria, e.g. CS centric users are kept in GSM while less CS centric users primarily using Packet Switched (PS) data services are kept in LTE and/or WCDMA. Further to simplify the description the term mobile station will be used to refer to any device connectable to a cellular radio network such as any User Equipment or (mobile) terminal.

In the GSM/WCDMA network this scenario implies that the CS speech calls either are ordinary mobile station originated/terminated CS speech calls initiated in the GSM/WCDMA radio network or mobile station originated/terminated CSFB calls initiated from the LTE or WCDMA radio network. If the distribution of the CSFB capable mobile stations is to remain the same in idle mode, the terminals that have performed a CSFB call are advantageously directed back to the radio network from which the CSFB call was initiated after the CSFB call has ended.

To enable the network to return a mobile station to another radio access technology the central nodes in GERAN or UTRAN, i.e. the Base station Controller/Radio Network Controller (BSC/RNC), needs to have information if a speech call was initiated using a CSFB procedure or not.

Mobile Station Originated Call:

In this scenario a mobile station performs a CSFB to a 2G or 3G network, i.e. a GERAN or UTRAN network, at a mobile originated (MO) CS call, i.e. a CS call initiated by a mobile station. The mobile station indicates to the Mobile switching Center (MSC) in a 3GPP 24.008 CM SERVICE REQUEST message that this MO call is due to CSFB by setting a new Information Element (IE) here termed CSMO. As a result the MSC is aware that the call is due to CSFB, however, this message is transparent to the BSC/RNC and thus these nodes remain unaware.

In accordance with some embodiments a new Information Element on the A and on the Iu interface is added. This new IE can in accordance with some embodiments be added to existing Base Station Subsystem (BSS) Management Application sub-Part/Radio Access Network Application Part (BSSMAP BSSMAP/RANAP) messages. For example, the BSC/RNC can receive from the MSC a new Information Element about whether the call being due to CSFB added to the existing messages specified:

For the A interface in 3GPP TS 48.008:
    ASSIGNMENT REQUEST
    RELEASE COMMAND
    COMMON ID
    HANDOVER REQUEST For the Iu interface in 3GPP TS 25.413:
   RAB ASSIGNMENT REQUEST
   IU RELEASE COMMAND
   COMMON ID
   RELOCATION REQUEST Mobile Station Terminated Call In this example the MSC is assumed to be aware of the call being due to CSFB as it has triggered the CSFB. Two different scenarios are described.

In the first scenario the mobile station has been connected to the network in E-UTRAN when paged by an MME. The MSC is aware that the mobile station is registered over SGs and can use the same means as outlined above to inform the BSC/RNC that the CS call is due to CSFB.

In the second scenario the mobile station has performed a combined Tracking Area update/Location Area Update (TAU/LAU), however, thereafter the mobile station re-selected/moved to 2G/3G coverage. This case exists if S4-SGSN (Serving GPRS Support Node) is deployed and ISR is supported in the network which is further discussed below. Otherwise a move to 2G/3G typically will trigger RAU (Routing Area Update) and LAU or combined RAU/LAU procedures.

Assume that the mobile station moves to the same Location Area (LA) as the one that it has registered to by using combined TAU/LAU. The mobile station will then perform RAU to obtain its PS services in the 2G/3G PS network, however, it has not performed a new LAU procedure. The result is that:
   MSC has the valid registration associated with the MME by SGs interface
   MME is aware that the mobile station is registered to the 2G/3G SGSN Therefore the MSC establishing a CS call for the mobile station will page the mobile station via the MME assuming that the mobile station is still in the E-UTRAN coverage.

Given that the MME is aware about the mobile station now being registered to a specific 2G/3G SGSN, it will forward the paging message to the appropriate 2G/3G SGSN. The paging procedure will be completed by the 2G/3G SGSN using the existing procedure(s).

The mobile can access the MSC, i.e. send 3GPP TS 44.018 Page Response in response to the CS paging received via the SGSN in the exactly same manner as if it has been paged via the MME.

Hence, the MSC will assume that this is a CSFB call, while the mobile station was at the time of the paging procedure under 2G/3G coverage and thus the call is actually not a native CSFB. In other words the procedure is not a procedure by which the mobile station has been moved from E-UTRAN coverage to 2G/3G coverage so that a CS call can be performed. The information that the mobile station was actually under 2G/3G coverage may be of importance in the algorithm implemented in the central node, BSC/RNC, that decides how the mobile station at the release of the CS call shall be managed with respect to the inter RAT scenario.

Though the procedure described above may be acceptable also for the case when the call is terminated by the mobile station it can in some embodiments be beneficial if the BSC/RNC is configured to distinguish between a circuit switched fallback scenario when the call is terminated by the mobile station where the mobile station is connected via an LTE radio access and when it is connected via a 2G/3G radio access.

In accordance with some embodiments the Gb/Iu_PS interface is modified in such a way that the BSC/RNC can distinguish that a CS paging message is received from the MME via the S3 interface. In accordance with one embodiment this is achieved by adding e.g. a new Information Element or a new flag to an existing Information Element, appended to the CS Paging message.

The BSC/RNC can in some implementations then cache such CS Paging message and store the included International Mobile Subscriber Identity/Temporary Mobile Subscriber Identity (IMSI/TMSI) value to identify the CS calls indicated by using the same procedure as suggested above for mobile originating call as CSFB as whether this CS call was initiated while the mobile station was under LTE or 2G/3G coverage.

An alternative implementation is to use the fact that in the case of a circuit switch fallback for a mobile station terminated call, where the mobile station that is subject for paging camps on LTE, the MME always sends the SGs SERVICE REQUEST message to the MSC. However, this message is not sent from the MME if the mobile station camps, during the circuit switch fallback for a mobile station terminated call procedure, on 2G/3G.

Thus the reception of the SGs SERVICE REQUEST message can be used by the MSC to decide whether a CSFB indication as described for mobile station originating calls above shall be sent to the BSC/RNC or not in ASSIGNMENT REQUEST/RAB ASSIGNMENT REQUEST.

Example Implementations

Figure 5:
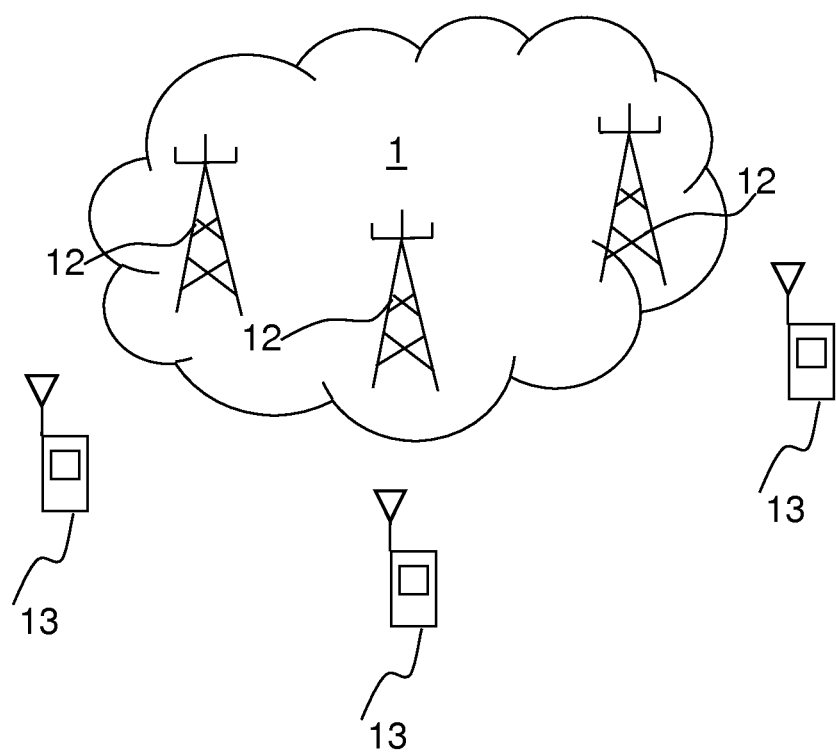
FIG. 5 is a view of an exemplary radio network.

Although the described solutions may be implemented in any appropriate type of telecommunication system supporting any suitable communication standards and using any suitable components, particular embodiments of the described solutions may be implemented in an LTE network, such as that illustrated in FIG. 5.

As shown in FIG. 5, the example cellular radio network 11 may include one or more instances of mobile stations 13 and one or more base stations 12 capable of communicating with these mobile stations, along with any additional elements suitable to support communication between mobile stations or between a mobile station and another communication device (such as a landline telephone). Although the illustrated mobile stations may represent communication devices that include any suitable combination of hardware and/or software, these mobile stations may, in particular embodiments, represent devices such as the example mobile station illustrated in greater detail by FIG. 6. Similarly, although the illustrated base stations may represent network nodes that include any suitable combination of hardware and/or software, these base stations may, in particular embodiments, represent devices such as the example base station illustrated in greater detail by FIG. 7.

Figure 6:
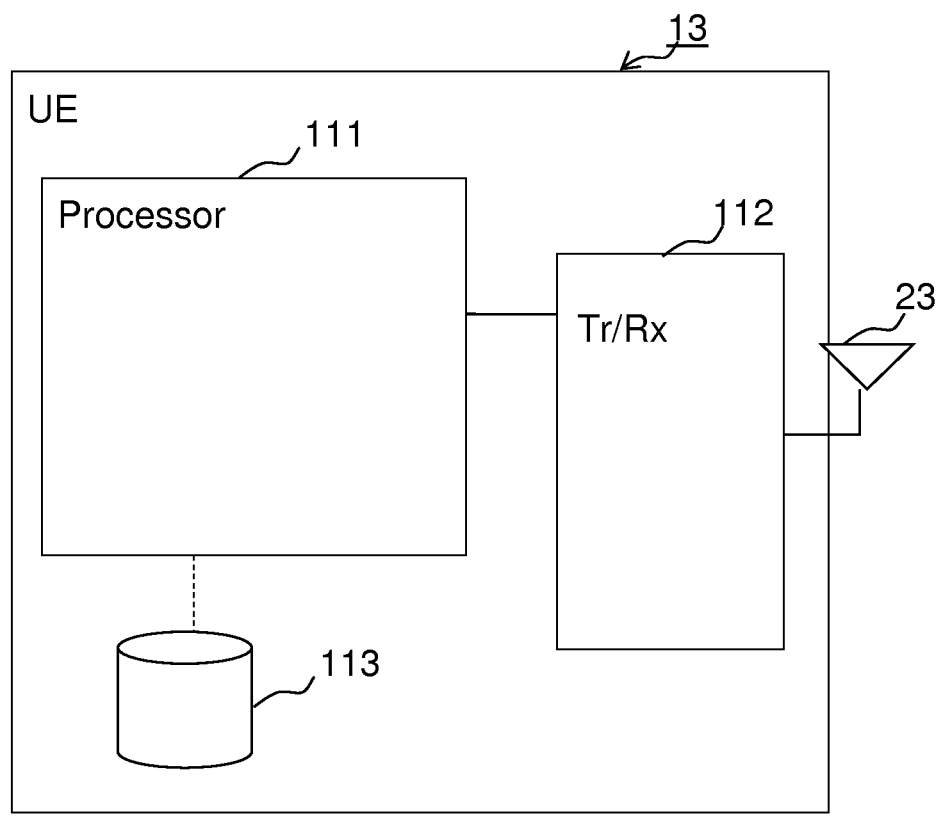
FIG. 6 is a view of an exemplary mobile station,
FIG. 7 a view of an exemplary radio base station,
FIG. 8 a view of an exemplary central node.

As shown in FIG. 6, the example mobile station 13 includes a processor 111, a memory 113, a transceiver 112, and an antenna 23. In particular embodiments, some or all of the functionality described above as being provided by mobile communication devices or other forms of mobile station may be provided by the mobile station processor 111 executing instructions stored on a computer-readable medium, such as the memory 113 shown in FIG. 6. Alternative embodiments of the mobile station may include additional components beyond those shown in FIG. 6 that may be responsible for providing certain aspects of the mobile station's functionality, including any of the functionality described above and/or any functionality necessary to support the solution described above.

Figure 7:
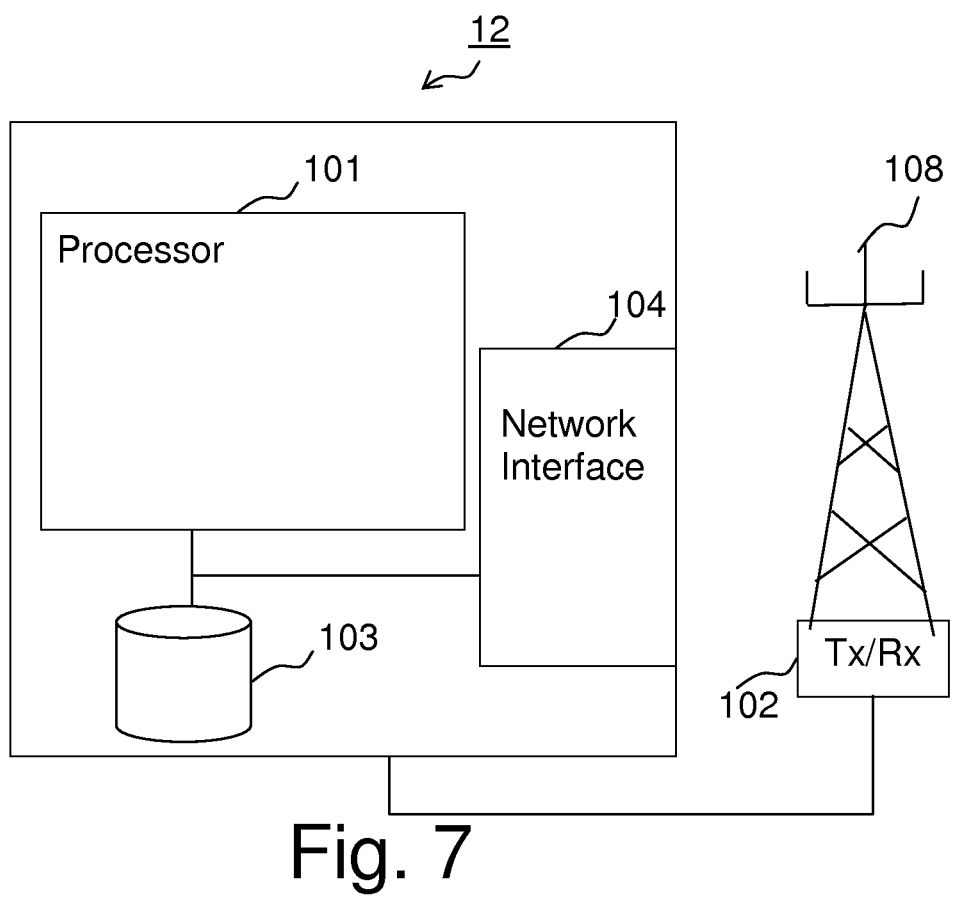

As shown in FIG. 7, the example base station 12 includes a processor 101, a memory 103, a transceiver 102, and an antenna 108. The example base station can also comprise a network interface 104. In particular embodiments, some or all of the functionality described above as being provided by a base station, a base station controller, a node B, an enhanced node B, and/or any other type of mobile communications node may be provided by the base station processor executing instructions stored on a computer-readable medium, such as the memory shown in FIG. 7. Alternative embodiments of the base station may include additional components responsible for providing additional functionality, including any of the functionality identified above and/or any functionality necessary to support the solution described above.

Figure 8:
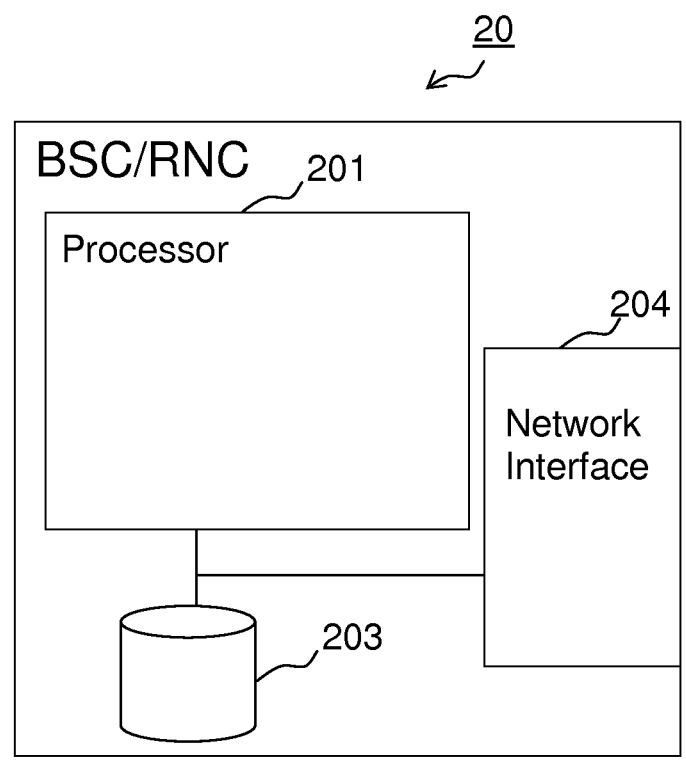

Further, FIG. 8 depicts an exemplary central node 20, such as an RNC or a BSC. The example central node 20 includes a processor 201, a memory 203, and a network interface 204 for connection to other nodes of a cellular network such as a base station and a Mobile Switching Center. In particular embodiments, some or all of the functionality described above as being provided by a central node, may be provided by the processor 201 executing instructions stored on a computer-readable medium, such as the memory 203.

Figure 9:
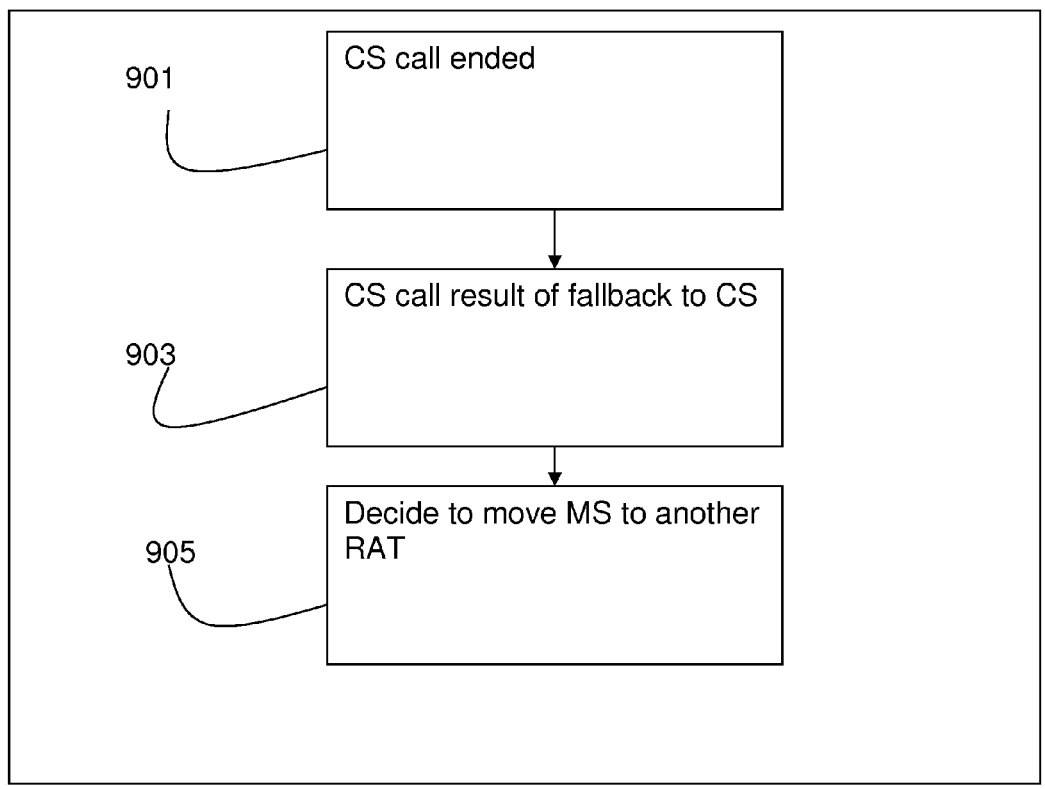
FIG. 9 is a flow chart illustrating some steps performed in a central node.

In accordance with some embodiments, the steps as illustrated in FIG. 9 can be performed by a central node. Thus in FIG. 9 a flow chart illustrating some steps performed in a central node such as a Radio Network Controller (RNC) or a Base Station Controller (BSC) is shown. Thus, in a method in a central node of a cellular radio network the central node is adapted to deciding if a mobile station connected to the cellular radio network via a first radio access technology controlled by the central node is to be moved to another radio access technology when a circuit switched call of the mobile station is ended. It is assumed that the cellular radio network is adapted to use a fallback to circuit switched procedure. First in a step 901 it is decided that a CS call for a particular mobile station has ended. Then in a step 903 it is checked if the CS call was the result of a fallback to CS procedure. The central node then in a step 905 decides if the mobile station is to be moved to another radio access technology based at least partly on the determination in step 903, i.e. if the CS call was a result of a CS fallback procedure.

For example if the circuit switched call was made by a mobile station having performed a fallback to circuit switched procedure, the mobile station can be returned to an original radio access technology from which radio access the fallback to circuit switched procedure was performed. The original radio access technology can in accordance with some embodiments be an evolved UTRAN or a similar radio access technology not supporting a CS connection.

In accordance with some embodiments, the central node receives information about if the circuit switched call has resulted from fallback to circuit switch procedure or not in a message from a Mobile Switching Center.

The invention claimed is:

1. A node of a cellular radio network that is adapted to use fallback to circuit switched procedures, said node comprising:
   a network interface configured to communicate with one or more other nodes of the cellular radio network;
   a memory circuit; and
   a processor operatively coupled to the network interface and the memory circuit, wherein the processing circuit is configured, with program instructions stored in the memory circuit for execution by the processing circuit, to:
      determine whether or not a circuit switched call of a mobile station connected to the cellular radio network via a first radio access technology controlled by the node has resulted from a fallback to circuit switched procedure; and
      decide whether the mobile station is to be moved to another radio access technology when the circuit switched call of the mobile station is ended, wherein said deciding is based on the determination of whether or not the circuit switched call has resulted from a fallback to circuit switched procedure; and
      responsive to a decision to move the mobile station to another radio access technology, send a message to the mobile station directing the mobile station to another radio access technology.

2. The node of claim 1, wherein the processor is further configured to decide that the mobile station is to be returned to an original radio access technology from which radio access technology the fallback to circuit switched procedure was performed, in response to determining that the circuit switched call resulted from a fallback to circuit switched procedure.

3. The node of claim 2, wherein the original radio access technology is an evolved UTRAN.

4. The node of claim 1, wherein the node is a Base Station Controller (BSC) or a Radio Network Controller (RNC).

5. The node of claim 1, wherein the processor is configured to determine whether or not the circuit switched call has resulted from a fallback to circuit switched procedure based on information about whether or not the circuit switched call has resulted from a fallback to circuit switched procedure, wherein said information is received by the node in a message from a Mobile Switching Center.

6. The node of claim 1, wherein the processor is further configured to decide that the mobile station is to remain connected to the first radio access technology when the circuit switched call of the mobile station is ended, in response to determining that the circuit switched call has not resulted from a fallback to circuit switched procedure.

7. A method in a node of a cellular radio network that is adapted to use fallback to circuit switched procedures, the method comprising:
   determining whether or not a circuit switched call of a mobile station connected to the cellular radio network via a first radio access technology controlled by the node has resulted from a fallback to circuit switched procedure; and
   deciding that the mobile station is to remain connected to the first radio access technology, in response to determining that the circuit switched call has not resulted from a fallback to circuit switched procedure.

8. A non-transitory computer-readable medium comprising, stored thereupon, computer program instructions configured so that when the computer program instructions are executed by a processor in a node of a cellular radio network that is adapted to use a fallback to circuit switched procedure, the computer program instructions cause the node to:
   determine whether or not a circuit switched call of a mobile station connected to the cellular radio network via a first radio access technology controlled by the node has resulted from a fallback to circuit switched procedure;
   decide whether the mobile station is to be moved to another radio access technology when the circuit switched call of the mobile station is ended, wherein said deciding is based on the determination of whether or not the circuit switched call has resulted from a fallback to circuit switched procedure; and
   responsive to a decision to move the mobile station to another radio access technology, send a message to the mobile station directing the mobile station to another radio access technology.

9. The computer-readable medium of claim 8, wherein the computer program instructions are further configured so as to cause the node to decide that the mobile station is to remain connected to the first radio access technology when the circuit switched call of the mobile station is ended, in response to determining that the circuit switched call has not resulted from a fallback to circuit switched procedure.

\* \* \* \* \*